US009942779B1

United States Patent
Proctor et al.

(10) Patent No.: US 9,942,779 B1
(45) Date of Patent: Apr. 10, 2018

(54) METHOD AND SYSTEM FOR USING CUSTOMER ANALYTICS TO DETECT NETWORK EVENTS

(71) Applicant: SPRINT COMMUNICATIONS COMPANY, L.P., Overland Park, KS (US)

(72) Inventors: John Charles Proctor, Leawood, KS (US); Wei Wu, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 225 days.

(21) Appl. No.: 14/108,572

(22) Filed: Dec. 17, 2013

(51) Int. Cl.
*H04W 4/02* (2009.01)
*H04W 24/02* (2009.01)
*H04L 12/24* (2006.01)
*H04L 12/26* (2006.01)
*H04W 24/00* (2009.01)

(52) U.S. Cl.
CPC .......... *H04W 24/02* (2013.01); *H04L 41/507* (2013.01); *H04L 43/045* (2013.01)

(58) Field of Classification Search
CPC ............. H04L 41/507; H04L 41/5067; H04L 41/5061; H04W 4/02
USPC ............ 455/423, 67.11, 67.14, 115.1, 115.2, 455/115.3, 115.4
See application file for complete search history.

(56) References Cited

U.S. PATENT DOCUMENTS

| 8,516,104 | B1* | 8/2013 | Liu ........................ H04L 43/16 379/133 |
| 8,577,332 | B1* | 11/2013 | Quint ...................... H04W 4/24 455/406 |
| 2007/0238416 | A1* | 10/2007 | Williams ................. A61N 1/08 455/67.11 |
| 2011/0053530 | A1* | 3/2011 | Kenington ............ H04W 88/08 455/115.1 |
| 2013/0275166 | A1* | 10/2013 | Diao ................ G06Q 10/06316 705/7.13 |
| 2013/0290194 | A1* | 10/2013 | Karlsson ............... H04L 41/069 705/304 |

FOREIGN PATENT DOCUMENTS

CN          102752767 B     * 12/2014

* cited by examiner

*Primary Examiner* — Kathy Wang-Hurst
*Assistant Examiner* — Said Elnoubi

(57) ABSTRACT

A method, system, and computer-readable medium are provided for providing a customer call analytics system for analyzing network events. In embodiments, customer calls from a mobile device to a network's customer care organization are an indication that a network event has occurred. An address associated with a user of the mobile device is identified. The network event is attributed to a base station associated with the address. Events associated with the base station are aggregated. A normal value for calls is determined based on historical data. A threshold value is set based on customer calls in excess of the normal value for the base station. A severity level is associated with the threshold value. The severity levels are monitored and tickets for network services are created and prioritized.

20 Claims, 6 Drawing Sheets

METHOD AND SYSTEM FOR USING CUSTOMER ANALYTICS TO DETECT NETWORK EVENTS

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, providing a method and system for using customer analytics to detect network events. In embodiments, a network operator utilizes a customer call analytics system to identify potential problems in the network based on analyzing customer calls or other communications from a mobile device or other user equipment to a customer care group of the network operator. The customer analytics system identifies sudden increases in the number of calls and other communications to customer care for network events associated with one or more base stations in the network. The base stations identified by the customer analytics system can then be scheduled for service by network technicians to determine the cause of the network events. For a base station in a network, a normal value for the number of calls to customer care and a threshold value for excess communications to customer care are determined. When a spike in the number of communications occurs and the threshold level is exceeded, a severity level for the applicable network base station is determined based on the number of communications to customer care. When the severity level is determined, the system generates a display signal, a severity report, or other warning indication to notify the network operator of an event associated with one or more network base stations.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
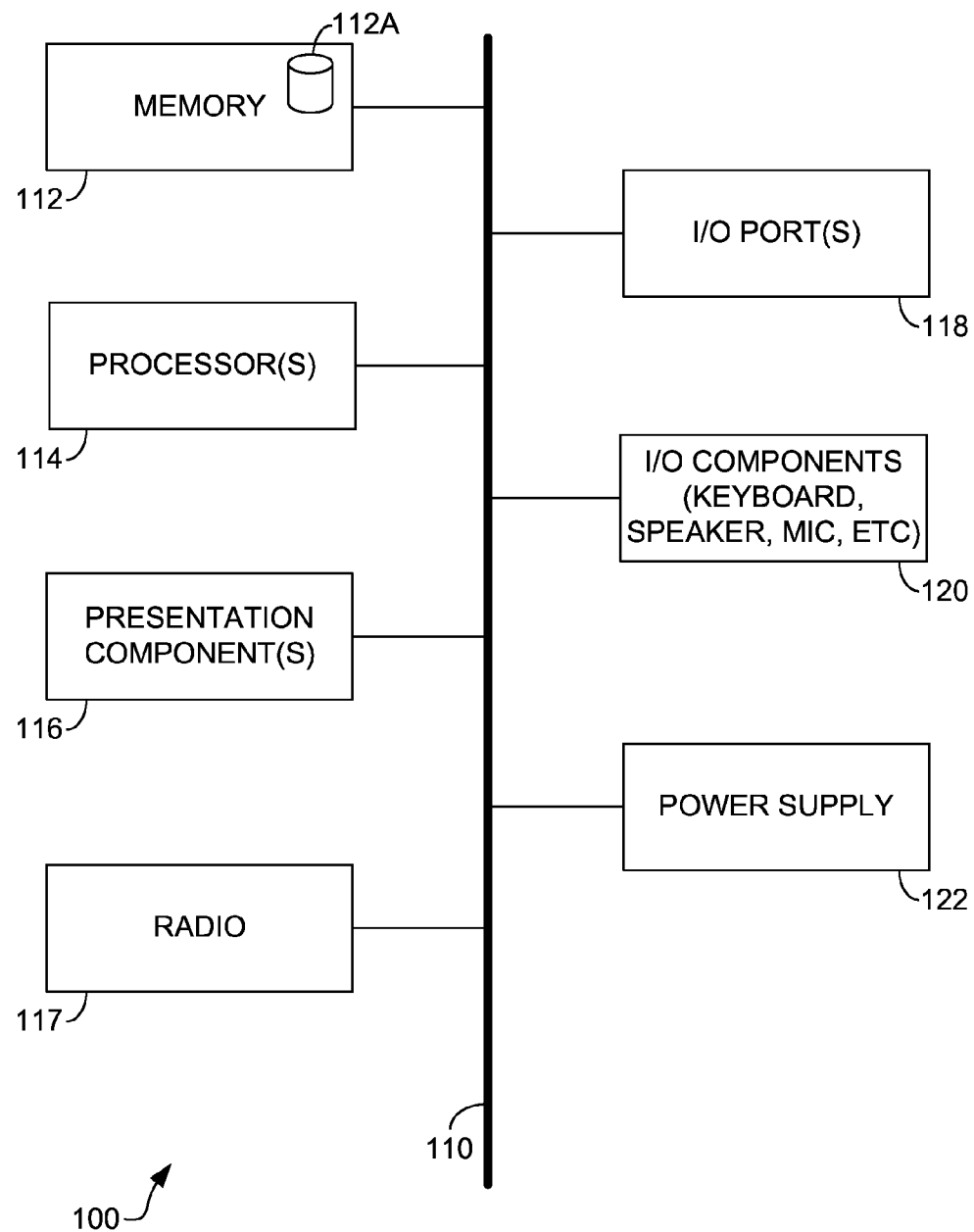
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Network operators utilize various systems embedded in the network to monitor network performance and various network events. However, certain network events, such as blocked calls or dropped calls, are underreported or unrecognized by the embedded network monitoring systems. In many instances, when network events are occurring with one or more base stations in a particular area of the network, the embedded network monitoring systems of the network operator may not detect such events. This leads to undetected events and the inability to isolate the events to a potentially problematic base station or group of base stations.

Embodiments of the present invention are directed to a customer analytics system for using customer calls to customer care to detect network events. The customer analytic system of the present invention is able to dynamically adjust normal and threshold values to increase the accuracy of detecting network events at the base stations. In addition, the customer analytic system can account for caller fatigue (e.g., where the number of calls to customer care on a specific event tapers off as time increases).

Accordingly, in one aspect, embodiments of the present invention are directed to one or more computer-readable storage media having computer-executable instructions embodied thereon that, when executed by one or more computing devices, cause the one or more computing devices to perform a method of providing a system for using customer calls to customer care to analyze network events. The method comprises: receiving from a customer care group of a network operator, information that a customer has communicated with the customer care group to indicate that a network event has occurred related to a network; identifying an address associated with the customer; attributing the information of the network event to one or more base stations in the network associated with the address; aggregating and storing the information of the network event associated with the one or more base stations in the network; determining a normal value of network events for a period of time based on the information stored; setting a threshold value associated with a severity level for the one or more base stations; analyzing the information for the network events to determine when the threshold value for one or more base stations has been exceeded for the period of time; and when the threshold value has been exceeded, providing an indication that the threshold value has been exceeded for the one or more base stations and providing the severity level associated with the threshold level.

In another aspect, embodiments of the present invention are directed to a method for providing an indication that a network event has occurred. The method comprises: providing a network coverage map that displays a selected geographic area in which a network operator has base stations to provide network services, wherein each network coverage map comprises a plurality of base stations providing network services; providing a number and percentage of base stations with an increase of events in a particular coverage area, the events based on the number of calls exceeding a threshold value; and providing a base station report, the base station report identifying problematic base stations and groups of base stations.

In yet another aspect, embodiments of the present invention are directed to a computer system for providing an analysis of network events based on customer calls to a customer care group of a network operator. The computer system comprises a processor coupled to a computer-storage medium, the computer-storage medium having stored thereon a plurality of computer software components executable by the processor. The computer software components comprise: a network event component that receives information from the customer care group that a network event has occurred for a customer; an identifying component that identifies a geographic address associated with the customer submitting the information regarding the network event; an attribution component that attributes the network event to one or more base stations associated with the address; an aggregation component that counts all the network events associated with each of the one or more base stations during a specific time period; an analytics component that obtains information from the aggregation component to establish and store a baseline normal value and a spike threshold value associated with each of the base stations, the baseline normal value and the spike threshold value dynamically determined based on historical tracking, wherein the analytic component compares the baseline normal value to the actual number of network events received for each of the base stations during the specific time period; and a report component that provides a prioritized report of network events by base stations.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
CRM Customer Relations Management
DVD Digital Versatile Discs
EEPROM Electrically Erasable Programmable Read Only Memory
GPRS General Packet Radio Service
GPS Global Positioning System
GSM Global System for Mobile Communications
HLR Home Location Register
iDEN Integrated Digital Enhanced Network
MSC Mobile Serving Center
MMS Multimedia Messaging Service
PC Personal Computer
PCS Personal Communications Service
PDA Personal Digital Assistant
RAM Random Access Memory
RF Radio Frequency
ROM Read Only Memory
SLA Service Level Agreement
SMS Short Message Service
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and non-volatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short. Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. A wireless telecommunications network might include an array of devices, which are not shown so as to not obscure more relevant aspects of the invention. Components such as a base station, a communications tower, or even access points (as well as other components) can provide wireless connectivity in some embodiments. In embodiments of the present invention, radio 117 also facilitates other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

The mobile device 100 can be any electronic device having radio frequency capabilities, that is, a device capable of emitting or receiving an RF signal. The mobile device may take on a variety of forms, such as a personal computer (PC), a laptop computer, a mobile phone, a personal digital assistant (PDA), or any other device that utilizes RF services as described herein.

Figure 2:
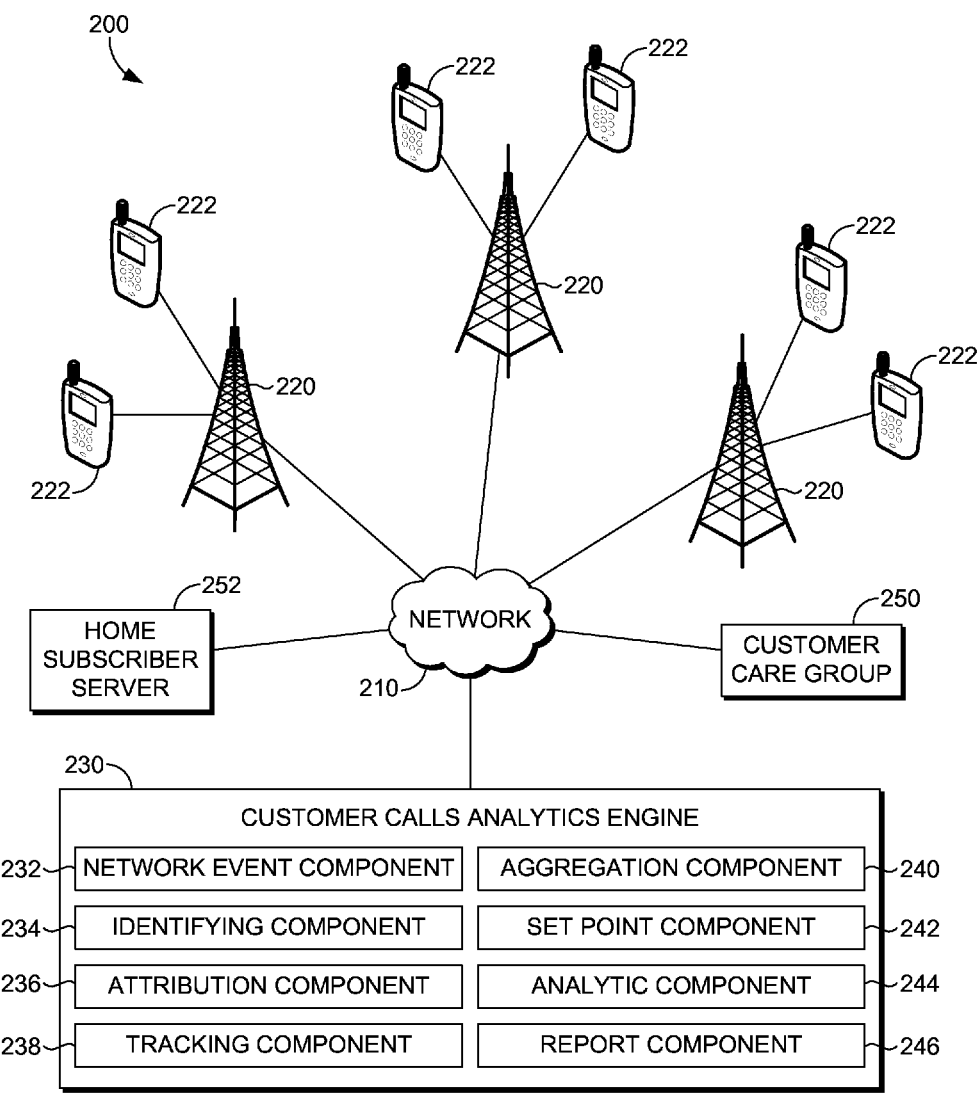
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, base stations 220 enable communication between user devices 222 (e.g., mobile devices, servers, a personal computers, etc.) and network 210. User devices 222 may take on a variety of forms, such as a personal computer (PC), a laptop computer, a tablet, a netbook, a mobile phone, a Smart phone, a personal digital assistant (PDA), or any other device that is cable of communicating with other devices. For example, the user device can take on any form, such as a mobile device or any other computing device capable of wirelessly communicating with the other devices using the network 210. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

In embodiments, the network 210 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 210 can include multiple networks, as well as being a network of networks, but is shown in more simple form so as to not obscure other aspects of the present invention. The network 210 can be part of a telecommunication network that connects subscribers to their immediate service provider. In embodiments, the network 210 can be associated with a telecommunications provider that provides services to user devices. For example, the network 210 may provide voice services to user devices or corresponding users that are registered or subscribed to utilize the services (e.g., the network 210) provided by a telecommunications provider. The network 210 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

Network operators typically have a customer care group that handles calls from the customers regarding their network services. The calls may be related to billing questions, mobile device usage, network events, or other similar matters. When a call is directed from the network 210 to the customer care group 250, a customer care agent working in the customer care group 250 determines the nature of the call and responds to the customer inquiry. When the call is related to a network event, such as dropped calls, blocked calls, slow data delivery, no text messages, etc., the customer care agent can forward the customer information and the nature of the network event to the customer call analytics engine 230 for analyzing network events.

The analytics engine 230 receives a customer telephone number or other identifying information for the customer. The analytics engine 230 also has access to the customer information stored on a home subscriber server 252 or other similar database in which the network operator stores customer information. Analytics engine 230 includes, in various embodiments, network event component 232, identifying component 234, attribution component 236, tracking component 238, aggregation component 240, set point component 242, analytic component 244, and report component 246.

Network event component 232 receives information from the customer care group that a network event has occurred based on a call from the mobile device associated with a customer. Network events may be associated with dropped calls, message failures, and the like. Network event information and customer information can be provided from a variety of origination points. In addition to obtaining information of a network event based on customer calls to a customer care group, the network operator may also obtain information from online submissions to the network operator's website or from customer information provided in-person by customers at a retail location of the network operator.

Identifying component 234 identifies a geographic address associated with a customer submitting information regarding a network event. The address may be provided by the customer and documented by the customer care group. The customer address and other customer information may be further verified based on customer account information obtained from the home subscriber server 252. In one embodiment, the address may be obtained based on account information associated with the caller. Once the address is obtained and/or verified, attribution component 236 attributes the issue to one or more base stations 220 associated with the address. This allows the network event to be isolated to the most likely base station 220 responsible for causing the network event.

Tracking component 238 assigns a tracking number to each network event reported to the analytics engine 230. The tracking component 238 may also maintain and update information regarding the nature of the event and any status update. This information may be provided by an agent from the customer care group 250. The tracking number and event status may help the customer care group 250 track the status of the event. Notes assigned to the event may be utilized in a report to assist a network technician troubleshooting the issue or a third party allocating resources to the issue.

Aggregation component 240 aggregates all the network events associated with the one or more base stations 220 during a specific time period. This allows a count associated with the issues for each base station 220 to be maintained.

Analytic component 242 obtains information from the aggregation component, which is used to establish a baseline normal value and a spike threshold value associated with each of the base stations. The baseline normal value may be determined based on the daily average of network events associated with the various base stations 220 in the network. A ninety day history period of time may be used to calculate the daily average to be used for the baseline normal value. The history period may be adjusted for longer or shorter periods for the base stations.

The analytic component 242 stores the baseline normal value for each of the base stations 220 based. The daily average of network events is the preferred embodiment, but shorter average time periods or longer average time periods may be used to determine the baseline normal value. For some base stations 220 with high traffic, the time period could be shortened to an hourly time period, for example between 5 p.m. and 11 p.m. For other base stations with low traffic, the average time period could be lengthened to span multiple days. Once the baseline normal value for network events and the applicable time period have been determined, the analytic component 242 compares the baseline normal value to the actual number of network events received for each of the base stations 220 for a comparable time period. The analytic component 242 creates and stores one or more spike threshold values for each of the base stations. The spike threshold values may be based on the number of calls in excess of the baseline normal value. The spike threshold values may also be based on the percentage of calls in excess of the baseline normal value, or a combination of the two methods. The spike threshold may also be adjusted dynamically based on an elapsed time since the spike threshold value was exceeded to account for caller fatigue. Each base station 220 may have multiple spike threshold values to indicate the severity of the network events. For example, a spike threshold value of a twenty count spike in the number of network calls events could be considered a low severity level and a spike threshold value of a forty count spike could be considered a high severity level. Multiple spike threshold values could be determined to provide multiple severity levels. In one embodiment, report component 246 is in communication with all of the other components of the customer call analytics engine 230. The report component 246 provides a prioritized report of network events by base stations. The prioritized report may identify problematic base stations or clusters of base stations. The report component 246 may further enable a user to open additional visuals and reports associated with the problematic base stations. Mapping functions are also included in the report component such that various geographic areas may be displayed showing the locations and network event status for base stations. The report component 246 may further generate a warning signal when a threshold value has been exceeded for one or more base stations and may maintain event status information on the network events associated with the warning signal.

Figure 3:
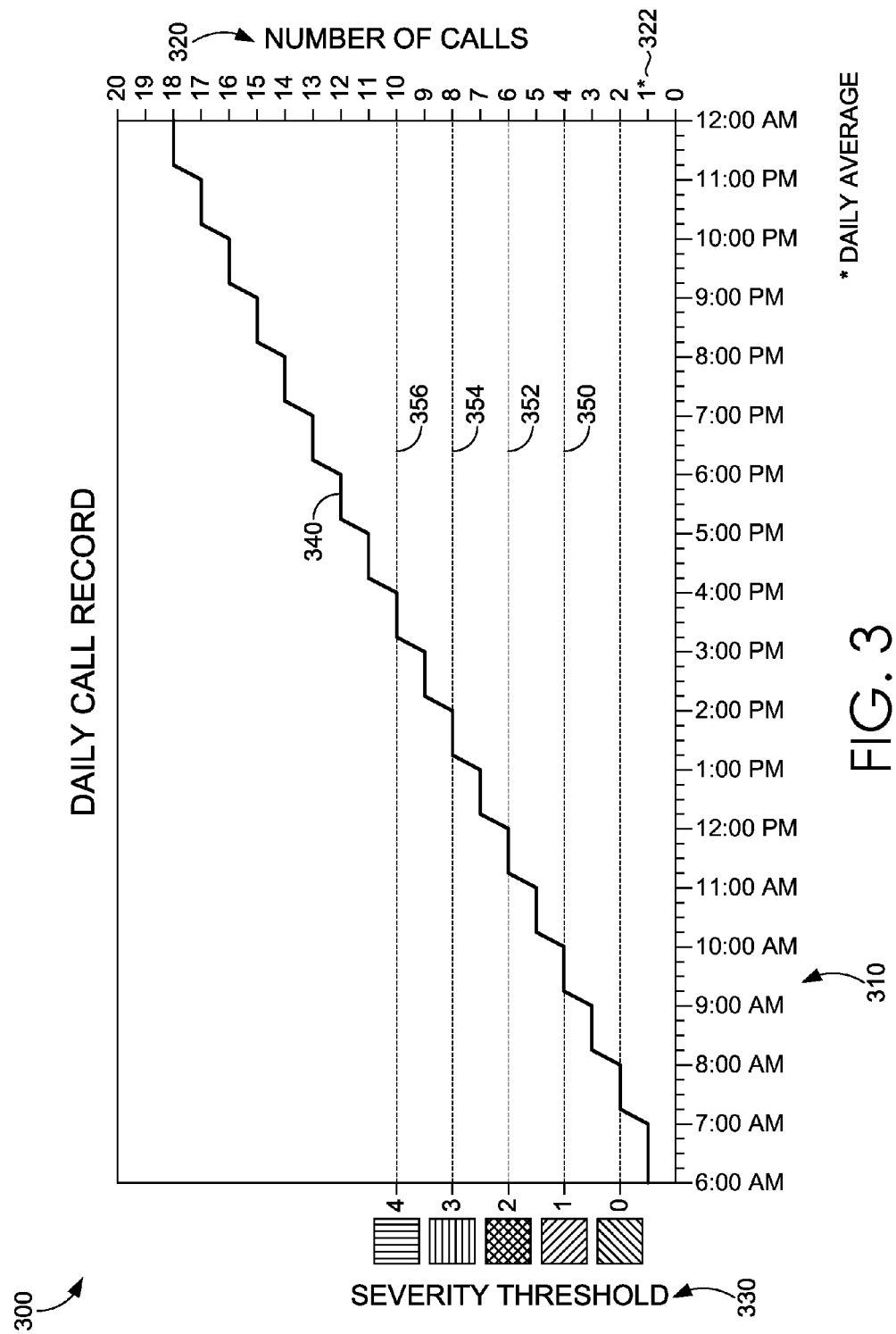
FIGS. 3-5 depict illustrative screen displays providing a customer analytics system for monitoring network events, in accordance with embodiments of the invention.
Figure 4:
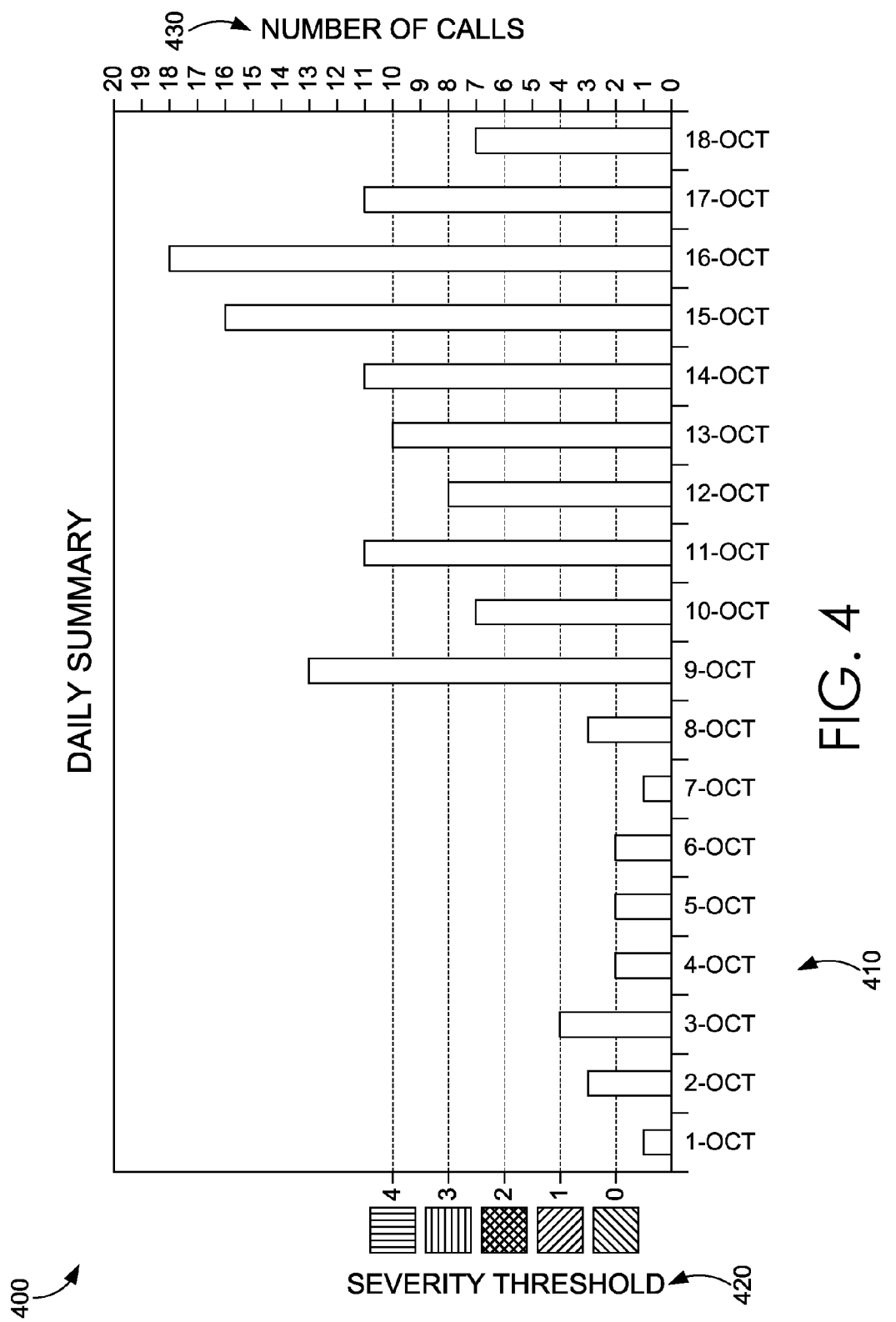
Figure 5:
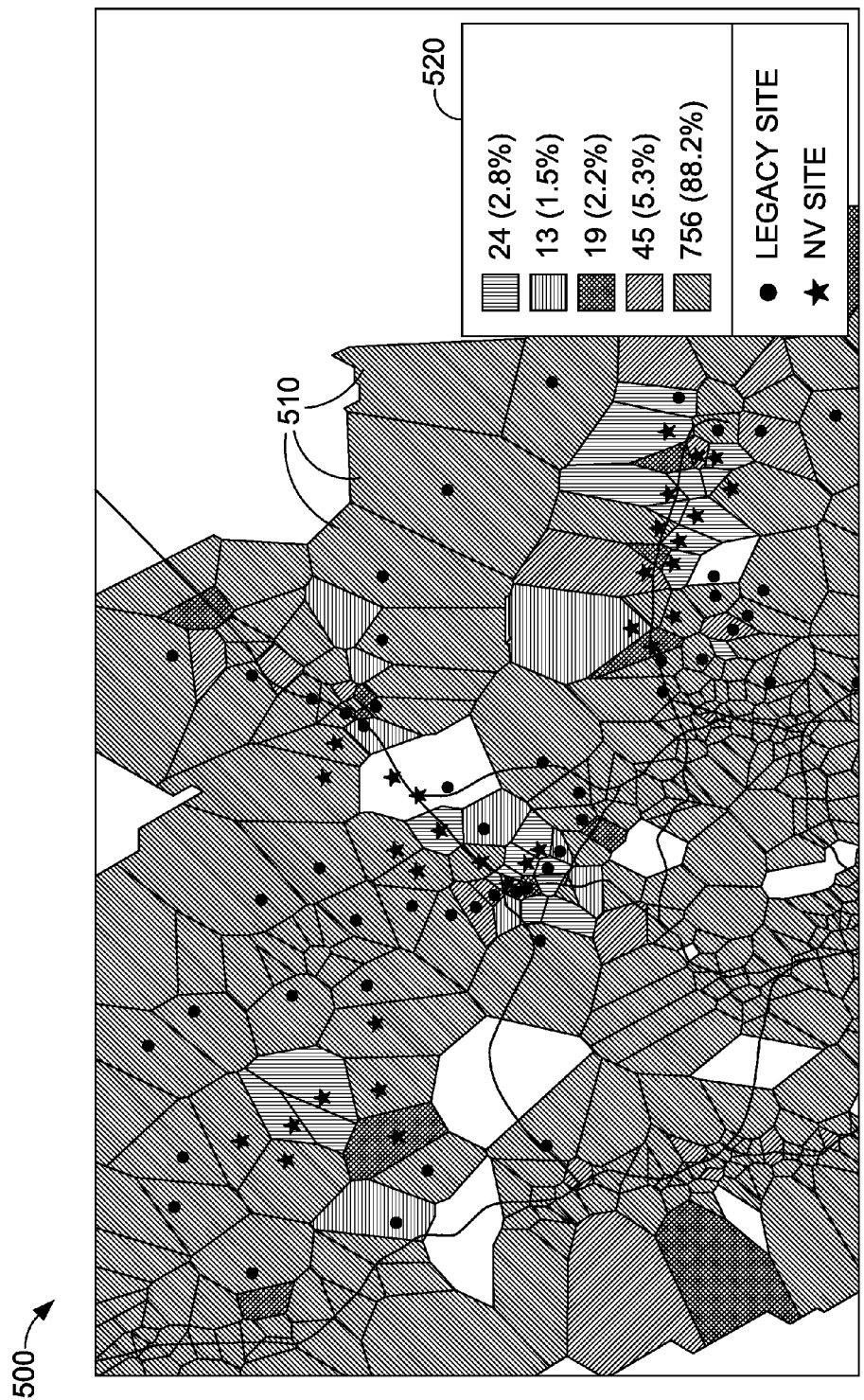

With reference to FIGS. 3-5, illustrative screen displays for displaying information from the report component 246 are provided. It is understood that the illustrative screen displays, or any other screen displays utilized to provide information related to the customer call analytics engine (collectively, the "screen displays"), are connected logically, such that they may assist in identifying and isolating network events related to one or more base stations. The screen displays may appear in any order and with any number of screen displays, without regard to whether the screen display is described or depicted herein. In one embodiment, the GUI is accessible via an in-store device. In one embodiment, the GUI is accessible via a web browser.

Referring now to FIG. 3, a representative daily call record 300 for all of the calls associated with a base station is provided. The horizontal axis 310 shows the time of day. The right vertical axis 320 shows the cumulative number of calls in a day to customer care which are related to network events for this base station. The left vertical axis 330 shows a severity level for the base station. This base station has a normal base line value of one call per day 322 (i.e., the daily average). A call line 340 is shown on the display which tracks the number of calls per day. A first severity threshold 350 is set at four calls per day. The second threshold 352 is six calls per day and a third threshold 354 is set at eight calls per day. The highest threshold 356, level 4, is designated for ten calls or more per day. The display of the graph line can be color coded to reflect the severity level. For three or fewer calls per day, a green color can be used on the display to indicate an acceptable event level. When a first severity threshold 350 is triggered at four calls, the color code for the call line can be changed to light green. The display color for over severity thresholds can be, for example, severity 2=yellow, severity 3=orange, and severity 4=red.

FIG. 4 is a display for showing a summary of the daily call record for the representative base station. The horizontal axis 410 provides a per day increment. The left vertical axis 420 shows the severity threshold. The right vertical axis 430 provides a number of calls and may use the same color scheme to display the various severity levels. The number of days in the display can be adjusted to show the shorter time periods or longer time periods. The displays shown in FIG. 3 and FIG. 4 show the actual number of calls, but as noted above, the displays could also be based on a percentage change in the number of calls.

Referring now to FIG. 5, a map of market display area 500 displays one or more geographic areas in which the network operator is providing network coverage for a plurality of mobile devices. Each polygon 510 on the map represents the coverage area for a single base station. The customer call analytics engine 230 obtains the account address for each customer call related to a network event and associates the account address with one or more base station locations as represented on the map by the polygons 510. For large polygons, the account address may be associated with just one base station. But the account address can be associated with more than one base station based on various criteria, such as size of the polygon, the adjacency of the polygons, the mobility patterns of the account mobile device, and other discretionary factors which can be programmed into the analytics engine 230. Each market display area 500 comprises a plurality of base stations 510 supporting the network coverage. The market display area 500 provides a high level overview of a coverage map that identifies markets of interest to the network operator. The user may also select a particular market and the market display area 500 provides a more granular view of that particular market. The granular view may display individual base stations or groups of base stations that support the network coverage for the selected market.

The polygons on the map in FIG. 5 may be color coded to indicate severity thresholds which have been exceeded for each of the base stations shown on the map. The color coding in FIG. 5 may be the same color coding as used for the daily call record of FIG. 3 and the daily summary of FIG. 4.

The network operator may monitor the various reports and display screens to detect that customer calls have exceeded a severity threshold, which indicates that some event has occurred at the base station. When the severity thresholds are indicated on the display map, the operator can than access more detailed reports for each of the base stations in question. In addition, the network operator can link the customer calls analytics engine 230 to the network monitoring systems used by the operator to monitor network performance. Network operators may use network monitor systems to generate service tickets or trouble tickets that are used by network service engineers and technicians to schedule maintenance work and troubleshooting at the base stations. The reports from the customer calls analytics engine 230 can be used to prioritize existing tickets and to generate new tickets for events not identified by the network monitoring systems. For example, if the analytics engine 230 identifies a severity four event and no ticket has been issued, the analytics engine 230 could generate a report and create a ticket to be investigated by the service engineers. If a ticket already exists, the reports for the analytics engine could be used to determine the customer impact associated with the base station such that the tickets with the highest severity level—customer impact can be prioritized for service work.

Figure 6:
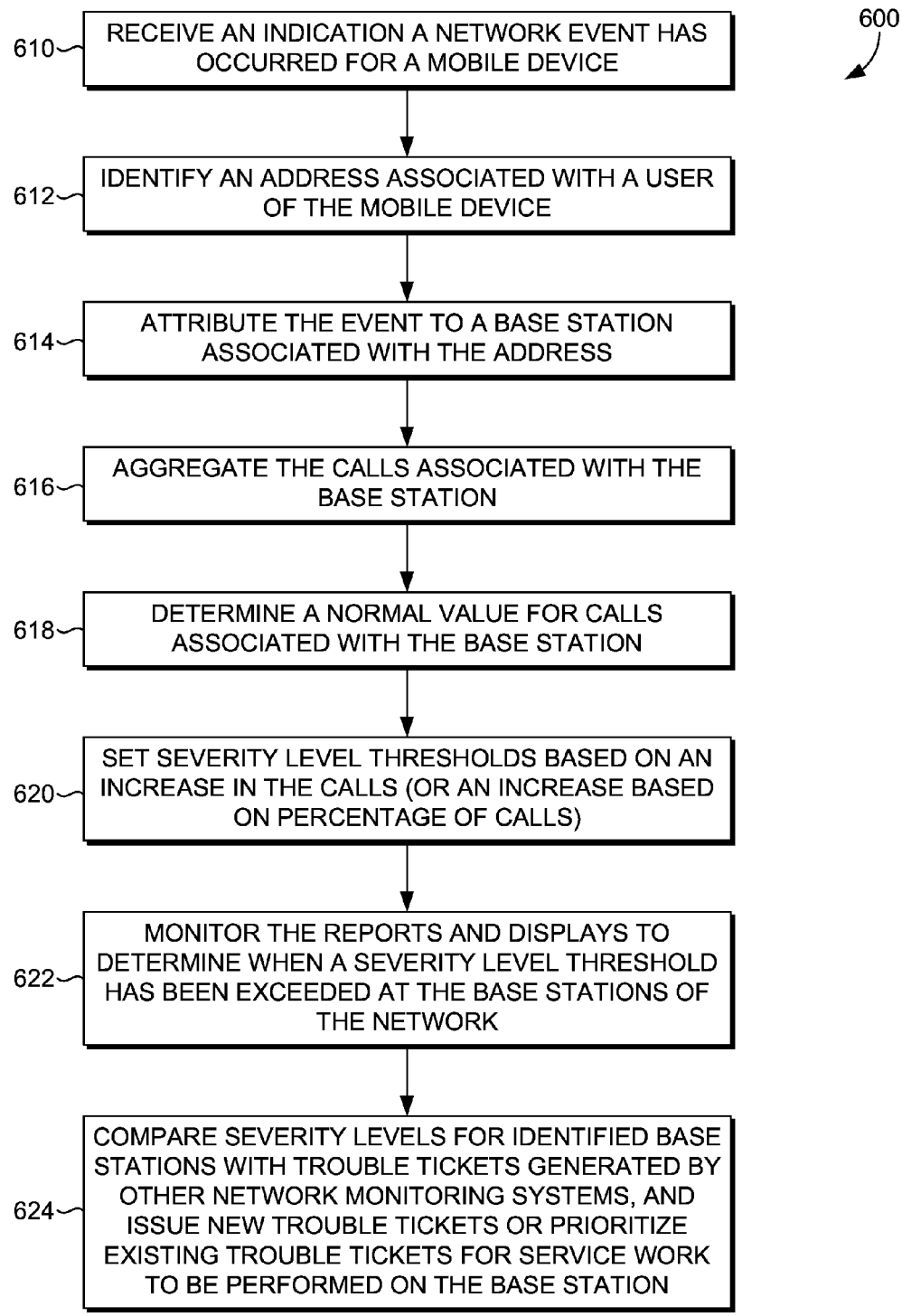
FIG. 6 is a flow diagram depicting an illustrative method of providing a customer analytics system for monitoring network events, in accordance with embodiments of the invention.

Referring now to FIG. 6, a flow diagram depicting a method 600 of using a customer call analytics engine to monitor network events is shown, in accordance with embodiments of the invention. Initially, as indicated at step 610, a call to customer care or other indication that an event has occurred for a mobile device is received. The event may be any event a user indicates is occurring (e.g., dropped calls, message failures, etc.). An address associated with a user of the mobile device is identified at step 612. The address may be obtained from or verified with account information associated with the user.

The event is attributed, at step 614, to one or more base stations associated with the address. In one embodiment, a tracking number is assigned to the event. In one embodiment, an event status is assigned to the event. In one embodiment, notes are assigned to the events. At step 616, the customer calls regarding the event are aggregated for each base station.

A normal value of customer calls is determined, at step 618, for each base station based on the history of calls related to the base station. Then one or more threshold values are set, at step 620, with a severity level assigned to each threshold value. The threshold values are based on an increase in the number of calls or a percentage increase in the number of calls. When a threshold value has been exceeded based on the number of calls or the percentage of calls, reports and/or displays may be generated, at step 622, to indicate a severity level for each of the base stations. When the calls to customer care trigger a severity level alert for a base station, a comparison is made with trouble tickets generated by other network monitoring systems at step 624. If a ticket already exists, the severity level can be used to prioritize service work on the trouble tickets for various base stations. If no trouble ticket has been generated, a new ticket is generated and report information is provided related to the events at the applicable base station.

Many different arrangements of the various components depicted, as well as components not shown, are possible without departing from the scope of the claims below.

Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. A non-transitory Computer-readable media having computer-executable instructions embodied thereon that, when executed by one or more computing devices, cause the one or more computing devices to perform a method of providing a system for using customer calls to customer care to analyze network events, the method comprising:

receiving from a customer care group of a network operator, information that a customer has communicated with the customer care group to indicate that a network event has occurred related to a network;

identifying the network event comprising dropped calls, blocked calls, slow data delivery, and message failures:

identifying an address associated with the customer;

attributing the information of the network event to one or more base stations in the network associated with the address;

aggregating and storing the information of the network event associated with the one or more base stations in the network;

determining a normal value of network events for a period of time based on the information stored;

setting a threshold value associated with a severity level for the one or more base stations;

analyzing the information for the network events to determine when the threshold value for one or more base stations has been exceeded for the period of time; and when the threshold value has been exceeded, providing an indication that the threshold value has been exceeded for the one or more base stations based on the number of calls in excess the baseline normal value and providing the severity level associated with the threshold level, wherein the normal value and the threshold value are dynamically adjusted based on historical tracking and elapsed time since the threshold value was exceeded to increase an accuracy of detecting network events.

2. The media of claim 1, further comprising generating requests for network services for the one or more base stations for which the threshold value has been exceeded.

3. The media of claim 2, further comprising prioritizing the request for network services based on the severity level.

4. The media of claim 1, further comprising assigning a tracking number to the network event.

5. The media of claim 1, further comprising comparing the network event to existing trouble tickets generated by other network monitoring systems.

6. The media of claim 5, further comprising prioritizing the existing trouble tickets based on the severity level.

7. The media of claim 1, wherein the threshold value is based on an increase in a number of network events communicated by customers.

8. The media of claim 1, wherein the threshold value is based on a percentage increase in a number of network events communicated by customers.

9. The media of claim 1, wherein the information is communicated based on a call from a mobile device associated with the customer, online submissions to a website associated with a network operator, or customer information provided in-person by the customer at a retail location of the network operator.

10. A computer system for providing an analysis of network events based on customer calls to a customer care group of a network operator, the computer system comprising a processor coupled to a non-transitory computer-storage medium, the non-transitory computer-storage medium having stored thereon a plurality of computer software components executable by the processor, the computer software components comprising:
- a network event comprising dropped calls, blocked calls, slow data delivery, and message failures;
- a network event component that receives information from the customer care group that the network event has occurred for a customer;
- an identifying component that identifies a geographic address associated with the customer submitting the information regarding the network event;
- an attribution component that attributes the network event to one or more base stations associated with the address;
- an aggregation component that counts all the network events associated with each of the one or more base stations during a specific time period;
- an analytics component that obtains information from the aggregation component to establish and store a baseline normal value and a spike threshold value associated with each of the base stations, the baseline normal value and the spike threshold value dynamically determined based on historical tracking, wherein the analytic component compares the baseline normal value to the actual number of network events received for each of the base stations during the specific time period, and elapsed time since the threshold value was exceeded to account for caller fatigue; and
- a report component that provides a prioritized report of network events by base stations.

11. The computer system of claim 10, wherein the information is based on a call from a mobile device associated with the customer.

12. The computer system of claim 10, wherein the information is based on online submissions to a website associated with a network operator.

13. The computer system of claim 10, wherein the information is based on customer information provided in-person by the customer at a retail location of the network operator.

14. The computer system of claim 10, further comprising a tracking component that assigns a tracking number to each network event communicated to the analytics engine, wherein the tracking number enables the tracking component to maintain and update event information regarding the nature of the network event and a status update associated with the network event.

15. The computer system of claim 10, wherein the baseline normal value is based on the daily average of network events associated with each of the base stations in the network.

16. The computer system of claim 10, wherein the spike threshold values are based on the number of calls in excess of the baseline normal value.

17. The computer system of claim 10, wherein the spike threshold values are based on a percentage of calls in excess of the baseline normal value.

18. The computer system of claim 10, wherein the spike threshold values define severity levels that indicate a severity of the network events.

19. The computer system of claim 10, wherein the report component further enables a user to open additional visuals and reports associated with the one or more base stations.

20. The computer system of claim 19, wherein the report component includes mapping functions enabling geographic areas to be displayed showing the locations and network event status for each of the one or more base stations.

* * * * *